April 4, 1961     L. CLEMENS     2,978,006
STUFFING MATERIAL FOR PACKING PURPOSES, AND PROCESS
AND DEVICE FOR THE MANUFACTURE THEREOF
Filed July 15, 1958     3 Sheets-Sheet 1
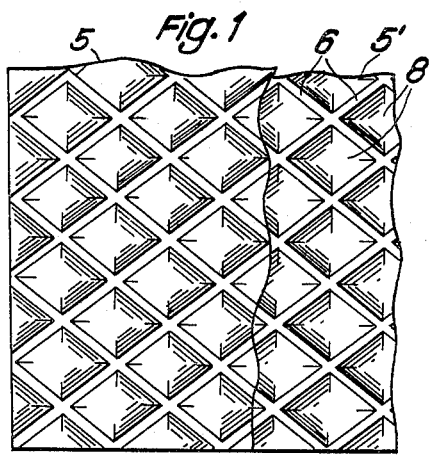
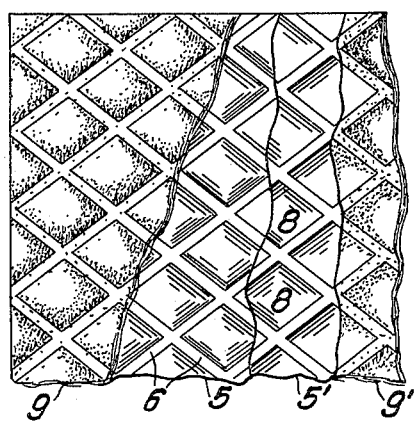
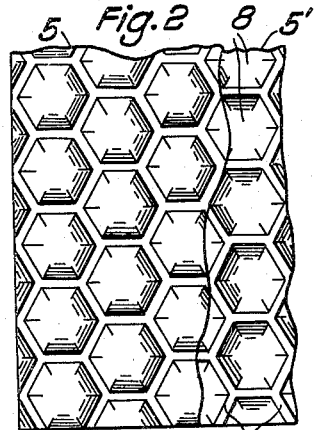
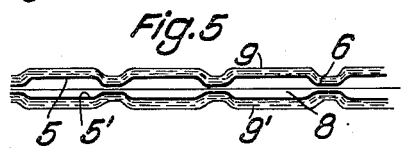
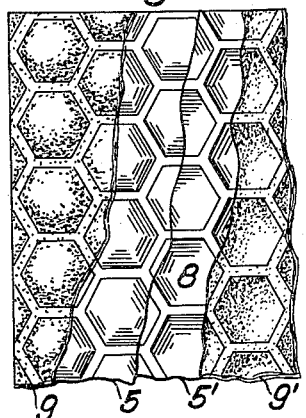
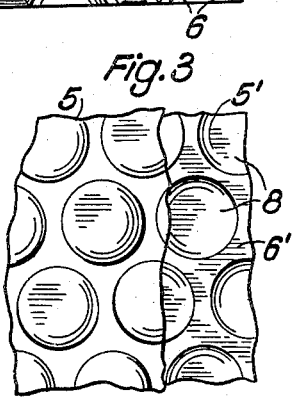
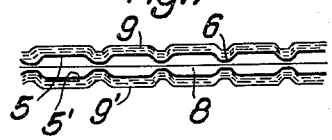
Inventor:
Ludwig Clemens,

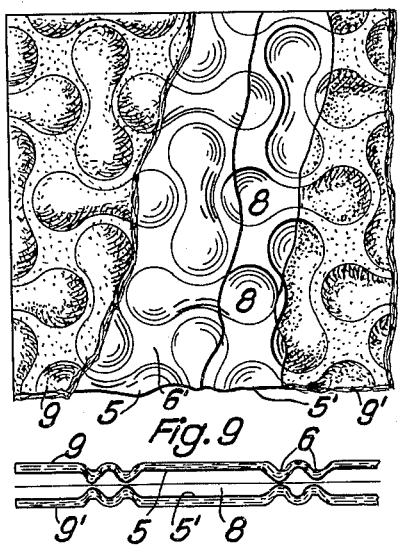
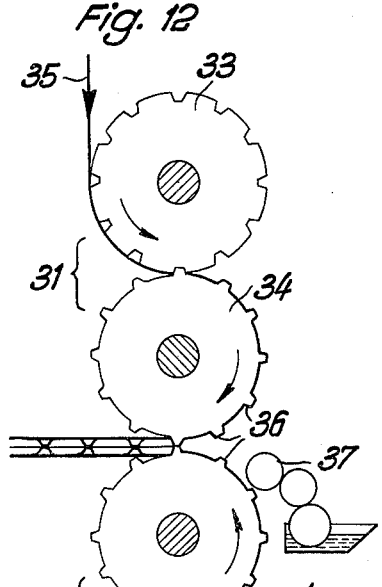
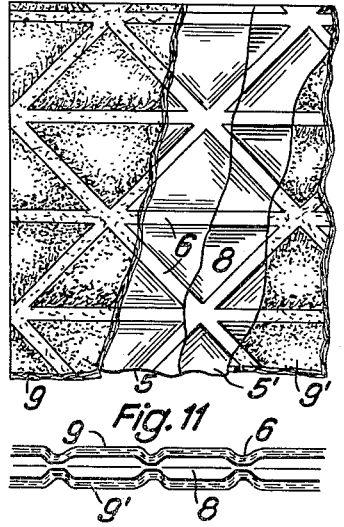
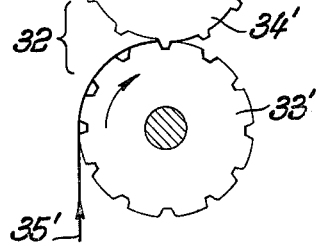
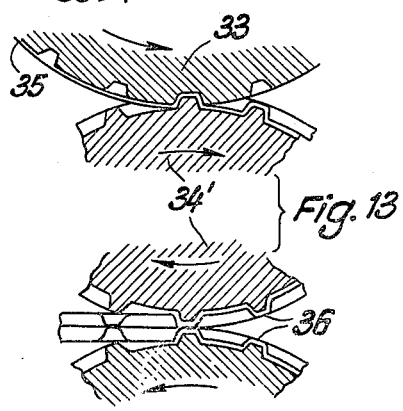

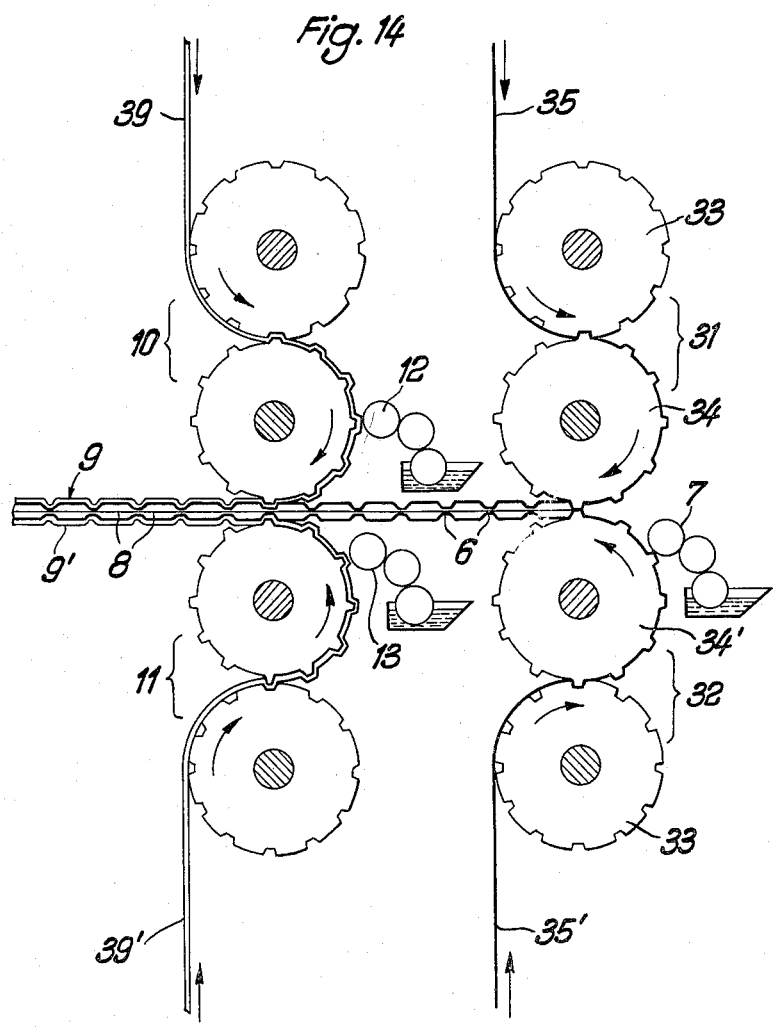

United States Patent Office 2,978,006
Patented Apr. 4, 1961

2,978,006

STUFFING MATERIAL FOR PACKING PURPOSES, AND PROCESS AND DEVICE FOR THE MANUFACTURE THEREOF

Ludwig Clemens, Wilhelmstrasse 44–46, Wiesbaden, Germany

Filed July 15, 1958, Ser. No. 748,640

2 Claims. (Cl. 154—32)

The invention relates to packing material, and relates more particularly to stuffing or filler material suitable for packing purposes.

A stuffing or filler material suitable for packing purposes must possess certain properties, among which the following are most important:

(1) The stuffing material should have sufficient mechanical strength and stiffness, so that it will not be crushed, torn, or otherwise mutilated by the objects to be packed between which it is disposed;

(2) The stuffing material should also have a sufficiently large transverse elasticity so that it can effectively resist any undesirable movement of the objects packed and any strong impact between these objects;

(3) In spite of its mechanical strength and stiffness, however, the stuffing material should be soft enough so that the surfaces of the objects to be protected which may be very sensitive, are not damaged lastly, (4) The stuffing material should retain its cushioning effect for as long as possible, even after it may have been mutilated or damaged by the objects to be protected.

A stuffing material which combines all the foregoing properties in a perfect manner has not yet become known.

A stuffing paper has, however, been created in the past from several paper webs which are partly smooth and partly stamped in high relief or embossed; these paper webs are glued together in the form of periodically recurring point or line-shaped designs; to this end upon the uppermost and the lowermost smooth paper web there are glued point by point a few layers of cellulose wadding which are connected together by the embossed design; the embossed design of the cellulose wadding is small in area as compared to that of the design formed by the glued spots of the paper web. This known stuffing paper approaches the previously mentioned demands made of a perfect stuffing material and probably represents the most favorable previously known solution to the problem. In many instances, however, the mechanical strength and stiffness of this stuffing paper of the prior art have proved to be insufficient.

It is also known to manufacture stuffing paper from several layers consisting of stampings in relief or embossings, secured together, for instance, by gluing. For the known stuffing papers of this kind there are required at least three layers, two layers of which are generally smooth while one layer is embossed. The embossed layer in this known stuffing paper is glued between the smooth layers, so that the smooth layers form the outer surfaces of the stuffing paper.

It is furthermore known to make stuffing paper by utilizing so-called wadding paper or cellulose wadding. In this connection there have been proposed various combinations of smooth or embossed papers with smooth or embossed wadding papers.

It is an object of the present invention to provide an improved stuffing material for packing purposes which combines mechanical strength and stiffness with soft surface characteristics so as to prevent any scratching or damaging of the sensitive surfaces of articles to be packaged.

Another object of the invention is to provide an improved stuffing material of the type referred to which is economical and easy to manufacture, as well as a process of making such stuffing material, and a machine for the manufacture thereof.

A further object of the invention is to provide an improved stuffing material which will have the properties previously outlined.

The stuffing material of the present invention has the advantage, compared to the known stuffing papers, that it is not only highly effective, but has a framework of only two layers of embossed material. Furthermore, these two layers originally are ordinary, smooth papers, that is, the layers do not need to be wadding paper or other paper which initially has any cushioning properties. By the utilization of only two layers of ordinary, smooth paper from which there is prepared an effective and attractive stuffing material, new possibilities are created for the economic manufacture of stuffing papers with simple devices.

It is therefore a still further object of the invention to provide a stuffing material which combines the desirable properties of the above mentioned known stuffing paper with improved mechanical strength and stiffness as well as with an improved cushioning effect.

The stuffing material of the invention generally comprises two foils of either paper, or cellulose, or synthetic material such as resin or similar strong material. The two foils are provided with embossings or stampings in relief which form line-shaped or other closed geometric configuration areas that face each other in mirror image fashion and which are glued together along their raised or embossed portions, so that between the embossings there are provided air spaces which are closed on all sides. Each foil is covered at its outer surface with a few layers of cellulose wadding which are held together by their own embossings identical to the embossings of the foils and which are glued along the embossed or raised portions to this foil.

The new stuffing material includes as a form of skeleton framework two foils of a mechanically resistant material such as strong paper or cellulose or a synthetic material such as polyethylene or an acrylic acid material which is provided with a predetermined, particular embossing. The embossings of the two foils are identical in mirror-image fashion so that when the foils are superimposed one upon the other, corresponding line-shaped embossings of the foils are in contact with each other. Since the line-shaped embossings enclose or form closed geometric areas, there are provided air pockets between the embossings of the foils closed on all sides by superimposing the two embossed foils. Since the two foils are glued to each other at the raised portions of the stampings or embossings which touch each other, the framework of the stuffing material is provided with a multiplicity of air cushions which are closed on all sides, the air cushions being disposed between the line-shaped raised portions of the foils formed by the embossing.

As far as the effectiveness of the stuffing material is concerned, it is immaterial which geometric forms the embossings of the two foils may take. It is, however, important that the embossings each enclose a multiplicity of surfaces so that between the embossings or raised portions of a foil there are created depressions which are supplemented by the mirror-image-like depressions of the other foils to define the aforesaid closed air spaces. Since the individual air spaces between the two embossed foils are completely closed on all sides, there results an extraordinarily good elasticity and cushion effect of this framework. The two foils joined to each other in the manner indicated above, however, would not yet constitute a suitable stuffing material, because the outer surfaces of foils suited for this purpose are too hard and unyielding and might scratch, press or otherwise damage sensitive objects such as instruments or glass ware.

For this reason it is proposed in accordance with the invention that each foil is covered on its outer surface with but a layer or stratum or a few layers or strata of cellulose wadding which are held together by embossings identical to those of the foil and which are glued to the foils at the raised portions thereof. The few layers of cellulose wadding thus glued to the foils lend to the stuffing material the necessary softness and yieldability of the outer surface. In order to obtain the required softness for the stuffing material in accordance with the invention only very few layers of cellulose wadding are required. A single or a few thin layers suffice which could not suitably be used without the framework formed by the embossed foils.

By means of the stuffing material of the invention, objects of many different kind may safely and faultlessly be packaged. Thus it is possible to wrap small and easily breakable objects, such as ampullae or other glass ware, as well as heavy objects such as for example sensitive instruments which need to be protected from impact or from any other cause of damage to their surfaces.

The stuffing material of the invention has the advantage that even if the layers of cellulose wadding disposed on the outer surface thereof may be partially damaged or partially be made ineffective in some other way, their cushioning effect is retained in a sufficient manner. For example, if the objects packaged are ampullae filled with liquid and if during transport in spite of careful packing one of the ampullae breaks so that the liquid content thereof runs out, the layers of cellulose wadding disposed on the surface of the stuffing material will absorb the liquid and hence lose their effect. However, the framework of the stuffing material that is composed of the foils is not detrimentally affected by the spilled liquid, and hence the cushioning effect is essentially retained. The same applies in case the layers of cellulose wadding disposed on the surface are mechanically damaged or torn. This may happen, for example, if the objects packed are instruments having points or sharp corners.

In all such cases a stuffing material which consists only of cellulose wadding would lose its cushioning effect. The stuffing material of the invention, however, has the advantage that it combines the softness of the cellulose wadding with the cushioning effect of air pillows and with the mechanical strength or resistance of mechanically stable foils without the stuffing material requiring a larger amount of material or higher manufacturing costs as do other previously known, but less effective stuffing materials.

Although the instant stuffing material may be made by suitably modified known processes, a preferred process is described below, though only by way of exemplification. The exemplified process for the manufacture of a stuffing material in accordance with the invention comprises the steps of providing two layers of smooth paper with identical embossings forming preferably point or line-like and uniform closed geometric configurations, providing the embossing of at least one layer with glue and putting the layer with the glued embossed ridges over the embossed ridges of the other layer, and gluing the two layers along the embossed or raised portions by means of pressure.

In accordance with the invention, the manufacture is commenced with two layers of ordinary, smooth paper which are then provided with exactly equal embossings. In order to obtain the success provided by the invention, it is important that both papers are embossed or provided with raised identical designs because, during the further operations to be performed on the two papers, their embossings must exactly match each other. The two embossed paper layers must be superimposed in such a manner that their raised portions or embossings face each other. The two paper layers can only be permitted to touch each other along these raised portions or ridges.

Before the two embossed paper layers are brought together in the manner described, the embossed portions or raised areas of at least one paper layer are covered with glue at their highest points which later will touch or contact the embossings of the other paper layer. After the two embossed paper layers have been brought together in the manner of the invention they are glued together along the outermost areas of the embossings. During this step a certain pressure must be exerted on the raised portions. This may be effected, in accordance with a further feature of the invention, by passing each layer through a pair of embossing rolls consisting each of a punch and a matrix and by utilizing the punches of the two embossing rolls at the same time for joining the two embossed webs after the raised portions of at least one web have been covered with glue.

The novel features that are considered characteristic of this invention are set forth with particularity in the appended claims. The invention itself, however, both as to its organization and method of operation, as well as additional objects and advantages thereof, will best be understood from the preceding recital and from the following description when read in connection with the accompanying drawings, in which:

Fig. 1 is a fragmentary plan view of a first embodiment of a suffing material in accordance with the invention, showing one raising or embossing pattern; parts have been broken away to illustrate two different layers;

Fig. 2 is a fragmentary plan view, similar to Fig. 1, but showing a different embodiment with a different pattern;

Fig. 3 is a fragmentary plan view, similar to Fig. 1, but showing another embodiment with another pattern;

Fig. 4 is a fragmentary plan view, similar to Fig. 1, but showing four layers;

Fig. 5 is an end elevational view thereof;

Fig. 6 is a fragmentary plan view, similar to Fig. 2, but showing all four layers;

Fig. 7 is an end elevational view thereof;

Fig. 8 is a fragmentary plan view of still another embodiment, illustrating still another pattern, exhibiting four layers;

Fig. 9 is an end elevational view thereof;

Fig. 10 is a fragmentary plan view of a further embodiment, illustrating four layers with a further pattern;

Fig. 11 is an end elevational view thereof;

Fig. 12 is a schematic, sectional view of a machine for manufacturing the stuffing paper of the invention;

Fig. 13 is a large scale fragmentary sectional view of the embossing portion of the two upper rolls of the preceding view, and of the area of the two center rolls where the two embossed paper webs join; and Fig. 14 is a schematic, sectional view of a machine for processing the paper and cushioning webs for the production of the complete stuffing material in accordance with the invention.

Referring now to the drawings, and more particularly to Fig. 1, there is illustrated a stuffing paper including two framework layers of paper 5 and 5' having line-shaped embossings or raised portions 6 and 6' (Fig. 3), respectively which form a wafer or rhomboid pattern. The hollow spaces or air cushions 8 are enclosed by the embossings 6 and 6' which are glued to each other. Fig. 2 illustrates the framework layers 5 and 5' with a honeycomb pattern. The air pockets 8 are formed by the embossings 6 and 6' in the shape of hexagons. Fig. 3 shows another embodiment wherein the hollow spaces 8 formed by the embossings or raised portions 6 and 6' have each the shape of a circle.

The framework layers 5 and 5' consist of paper or synthetic material such as cellulose or the like. The layers 5 and 5' are provided with embossings 6 and 6', respectively, forming identical, closed geometric figures. The two layers 5 and 5' face each other in the manner of a mirror-image and are glued together with their raised portions or embossings 6 and 6' so that the air cushions 8 are formed thereby.

On the two outer faces of the framework layers 5 and 5' there are provided cellulose wadding layers or strata 9 and 9', respectively, as shown for example in Figs. 4 and 5. Each wadding layer is glued to its framework layer.

The designs of the raised or embossed portions 6 and 6' may be of different kinds as exemplified by Figs. 1–11, as long as the hollow spaces 8 are enclosed by the embossings. Particularly suited for the stuffing material of the invention are line-shaped embossings such as the rhomboids or wafer form of Figs. 1, 4 and 5 and the hexagons or honeycomb shapes of Figs. 2, 6 and 7. The design of Figs. 8 and 9 includes embossings which have relatively large raised areas to form a dumb-bell-like shape of the hollow pockets 8. Figs. 10 and 11 illustrate a triangular pattern formed by the embossings 6 and 6'.

As shown in Fig. 12, the machine for manufacturing the stuffing paper includes two pairs of embossing rolls 31 and 32 which rotate with equal speed but in opposite directions. The matrices 33 and 33' and the punches 34 and 34' are so disposed with respect to each other that the raised embossing designs of the two punches 34 and 34' roll against each other in a tangential direction and almost touch each other in the area between the rolls 31 and 32.

The smooth webs 35 and 35' of paper or other suitable foil material previously named, which are to be embossed, are provided with embossed or raised portions 36 while passing through the pairs of embossing rolls 31 and 32 provided with the same embossing design in such a manner that the embossings 36 meet each other and exactly cover each other. Prior to joining the two webs the embossings of one of the webs, for instance of the web 35' is covered with glue by a gluing device 37 which operates to roll the glue from a glue container onto the web by means of rotating rolls. Consequently, as illustrated in Fig. 13, when the two webs 35 and 35' are rolled or passed over the rolls 31 and 32, the embossings 36 are glued together under pressure furnished by the rolls.

The design of the embossings for the stuffing paper to be manufactured does not need any particular shape. I have found, however, that designs with point or line-shaped embossings forming regularly recurring geometric figures, are best suited.

A further machine in accordance with the invention for the manufacture of the stuffing material is shown in Fig. 14. The machine includes the two pairs of embossing rolls 31 and 32 which are provided with the same designs or patterns and which rotate with the same speed but in opposite directions. The framework foils 35 and 35', to be embossed, such as paper or synthetic material and the like, are provided with embossings 6 and 6' during their passage through the rolls 31 and 32. The embossings 6 and 6' exactly meet each other and enclose the hollow spaces 8. By means of the gluing device 7 the embossings of one foil are provided with glue before the two foils are permitted to join, so that the embossings or raised portions are securely joined under pressure.

The application of the cellulose wadding layers or strata 39 and 39' is effected subsequently in a similar manner by means of two pairs of embossing rolls 10 and 11 which are provided with the identical embossing design and which exactly cover the embossings of the cellulose wadding with those of the glued foils 35 and 35'.

By means of gluing devices 12 and 13, the two cellulose wadding layers 39 and 39' are provided with glue at their raised portions and are securely joined to their support after passing through the pairs of embossing rolls.

I wish it to be understood that I do not desire to be limited to the exact details of exemplification of construction shown and described, or of exemplified steps outlined, for obvious modifications will occur to a person skilled in the art.

Having thus described the invention, what I claim as new and desire to be secured by Letters Patent, is as follows:

1. A process for the manufacture of stuffing or packaging material including two layers of smooth paper and two strata of cellulose wadding, said process comprising the steps of embossing simultaneously each of said paper layers in such a manner that the embossings include raised portions connected together, applying glue to the raised portions of at least one of said paper layers, joining said paper layers so that corresponding raised portions of said two paper layers are glued together, embossing two strata of cellulose wadding, with each stratum corresponding in shape and contour to one of said layers, and joining each stratum to the exterior of its layer, with the raised portions of each stratum glued to the raised portions of the layer.

2. A machine, for use in the manufacture of a stuffing or packaging material having two first layers of sheet material and externally thereof two second layers of cellulose wadding material, comprising two adjacent stages, each stage including two pairs of embossing rolls, each pair of rolls including a punch and a matrix, means operable for rotating all of said rolls at a synchronous speed, said two punches having raised portions forming identical designs and being disposed with their axes parallel to each other and being arranged to rotate in opposite directions in such a manner that the raised portions of said punches roll one against the other in a tangential direction without touching each other, whereby each matrix and punch adjacent thereto may emboss and feed a layer of material and said punches may exert pressure upon said sheets at the embossings thereof, the rolls of one stage uniting said two first layers, and the rolls of the other stage superimposing on each first layer a second layer of cellulose wadding material.

References Cited in the file of this patent

UNITED STATES PATENTS

| | | |
|---|---|---|
| 798,804 | Kunz | Sept. 5, 1905 |
| 1,941,255 | Fourness | Dec. 26, 1933 |
| 2,441,476 | Ewald | May 11, 1948 |
| 2,622,051 | Hermanson et al. | Dec. 16, 1952 |
| 2,633,442 | Caldwell | Mar. 31, 1953 |
| 2,675,053 | Clements | Apr. 13, 1954 |
| 2,699,599 | Potchen | Jan. 18, 1955 |
| 2,851,390 | Chavannes | Sept. 9, 1958 |
| 2,858,247 | DeSwart | Oct. 28, 1958 |

FOREIGN PATENTS

| | | |
|---|---|---|
| 536,781 | Germany | Oct. 26, 1931 |
| 160,551 | Australia | Jan. 13, 1955 |
| 539,745 | Italy | Feb. 22, 1956 |